Dec. 8, 1942.  C. B. PAPE ET AL  2,304,591
FLEXIBLE CHEESE PACKAGE
Filed March 13, 1939
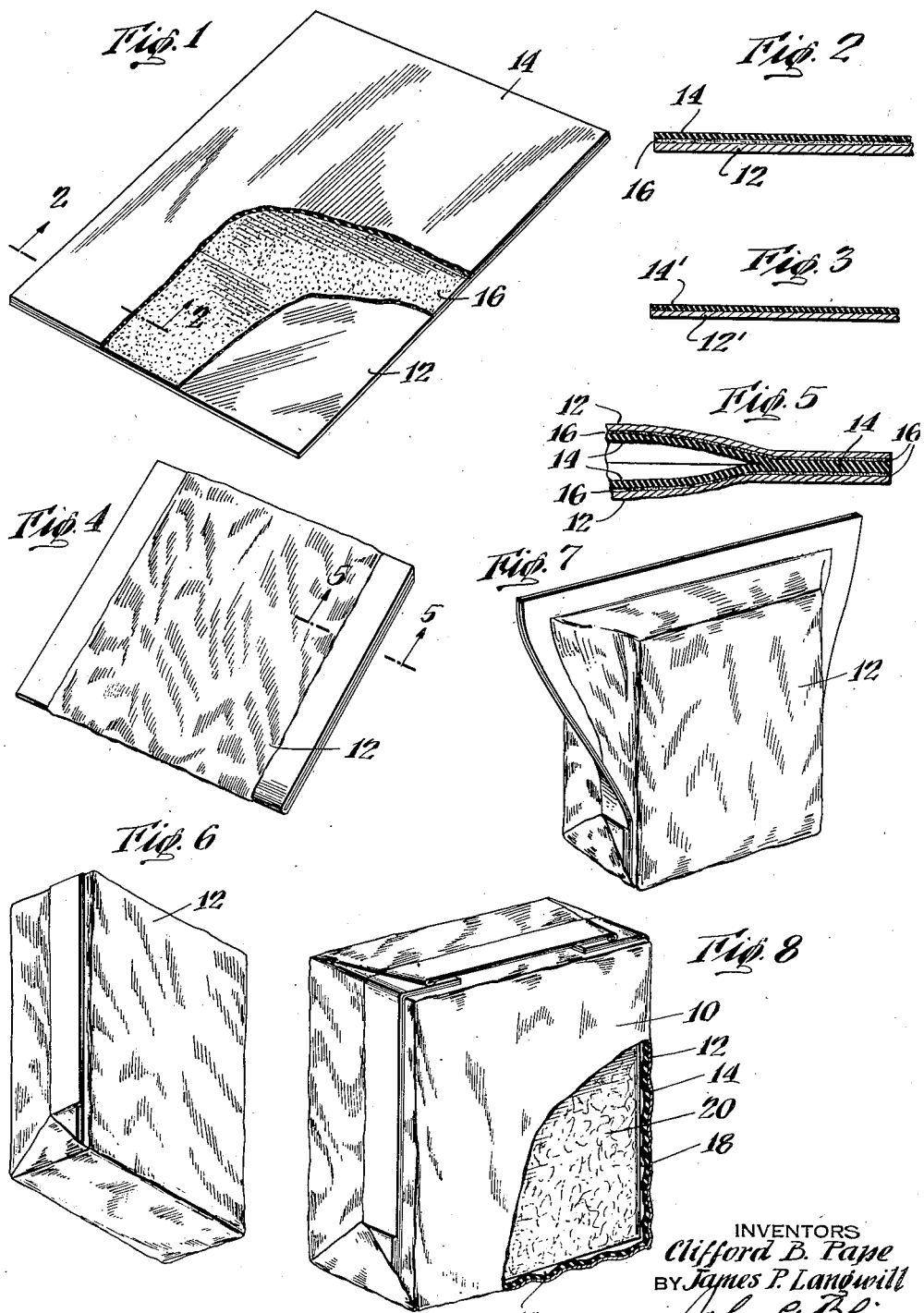
INVENTORS
Clifford B. Pape
BY James P. Langwill
John C. Bliss
ATTORNEY Patented Dec. 8, 1942

2,304,591

UNITED STATES PATENT OFFICE 2,304,591

FLEXIBLE CHEESE PACKAGE

Clifford B. Pape and James P. Langwill, Chicago, Ill., assignors to Reynolds Metals Company, Richmond, Va., a corporation of Delaware Application March 13, 1939, Serial No. 261,600

5 Claims. (Cl. 99—178)

This invention generally relates to a new and improved package and method of packaging natural cheeses, particularly partially cured cheese of the so-called "American" type.

Heretofore, great difficulty has been encountered in attempts to cure and market natural "American" cheeses. It has been customary to manufacture the cheeses in large forms, from twenty to one hundred pounds, and to encase such large forms in cheesecloth with an over-coating of paraffin, or the like, to prevent mould. Even with such treatment, the large cheeses develop a substantial amount of rind, sometimes approaching three percent of the weight of the cheese.

The reason for the cheesecloth and paraffin treatment was to prevent mould, and no other feasible way has been found to date to protect the cheeses from bacterial action. Under such circumstances, it is manifest that it would be inexpedient to form such cheeses, with such casings, in units which would be suitable for distribution to households, namely, units weighing one-half pound or one pound, or slightly larger, because in this latter event, placing the paraffin casing on such small cheeses would be expensive and when the cheese was to be eaten, the casing would have to be laboriously removed.

Many attempts in the past have been made to scientifically package such small units of natural "American" cheese in such fashion that they are rindless and do not develop mould, but these attempts so far as flexible packages are concerned have not been successful commercially.

Therefore, it is an object of our invention to provide a suitable type of packaging for small units of natural "American" cheese.

It is a further object of our invention to provide a simple, inexpensive, flexible envelope for small units of "American" cheese, which envelope will allow the continued curing of the cheese, if desirable, and which further does not require any special treatment in an effort to cause the inner surface of the envelope to be in definite and continuous contact with the cheese surface; in the past this latter factor has been emphasized in certain suggested forms of packaging, but we find that the provision of such special continuous contact is unnecessary.

It is a further object of our invention to provide a simple and economical envelope for small units of natural "American" cheese, which envelope will maintain the cheese in the vapors which escape from the cheese, but which package will allow any excessive pressure to escape from the package. In this connection, it is our belief that natural "American" cheese, during its curing process, evolves presumably $CO_2$ gas, and that such gas, if maintained in proximity to the cheese so that it surrounds the same, acts as a preservative for the cheese and prevents mould.

It is a further object of our invention to provide a simple and economical cheese envelope, the edges of which may be heat sealed, in face to face relation, in such way that excessive gas pressures within the envelope may escape, and yet to provide a substantially air-tight package preventing formation of rind and which will be, for practical intents, a hermetically sealed package except for excessive gas pressures, thus maintaining the cheese in an atmosphere of its own vapor, presumably $CO_2$ gas, preventing mould.

It is a further object of our invention to package cheeses after they have been partially cured, namely, from five days to two weeks, or after longer periods, in such fashion that such partially cured cheese is rindless. The rindless cheese, in partially cured form, is inserted into an envelope of such character as described above, evolves presumably $CO_2$ gas and remains substantially fresh and good without formation of rind or mould for considerable periods of time under normal or refrigerating conditions of temperature.

It is a further object of our invention to package partially cured "American" natural cheese, if necessary, under vacuum conditions or under neutral gas conditions, preferably employing $CO_2$ gas, in order to exclude any mould.

It is a further object of our invention to package cured or partially cured, or rindless or slightly rinded, natural cheeses in an envelope formed preferably of metal foil and an inner liner of Pliofilm (rubber dihydrochloride sheeting which is flexible, somewhat elastic, possesses good tensile strength), the two being preferably joined with a face to face heat fusible seal around the package. Such a package with Pliofilm lining allows the gas to escape under abnormal pressures. We realize that such packages can be used to create such a flexible venting package; and it will be further recognized that such packages should be substantially air-tight so far as the entry of air into the package from the outside is concerned.

It is a further object of our invention to package natural cheeses, cured or partially cured, in packages such as described hereinabove, in such fashion that the package loosely envelops the cheese, rather than being in tight contact therewith.

These and various other objects and advantages of our invention will be readily understood from the following description taken in connection with the accompanying drawing of preferred embodiments of our invention, and in which modifications may be made without departing from the scope of the appended claims.

In the drawing:

Fig. 1 represents a perspective, partly broken away, of a blank of wrapping material suitable for use as a packaging medium for the employment of our invention;

Fig. 2 is a section taken on the line 2—2 of Fig. 1;

Fig. 3 is an alternate form of packaging material, namely, Pliofilm, directly coated upon metal foil, suitable for our invention;

Fig. 4 is a fragmentary perspective of an envelope embodying our invention, with its side edges fused in face to face relation;

Fig. 5 is a section taken on the lines 5—5 of Fig. 4;

Fig. 6 is a perspective of the envelope shown in Fig. 4, with its bottom and sides squared up so as to give a rectangular shaped envelope or package.

Fig. 7 is a perspective of an envelope embodying our invention, showing the method of sealing the side edges and top edges in face to face relation;

Fig. 8 is a perspective view, partly broken away, of the complete envelope with its side edges and top sealed, which shows the cheeses therein, loosely enveloped by the package.

In these figures, considering Figures 1, 2, 4, 5, 6, 7 and 8, a flexible cheese package 10 is preferably formed of a sheet of thin aluminum foil 12, of perhaps .0005 inch in thickness which is opaque, and a sheet of rubber base film, such as Pliofilm, indicated as 14, of a thickness of about .001 inch, the two sheets being co-extensive and preferably joined by any suitable adhesive, which will unite the two sheets and allow flexibility, a suitable adhesive being Vistanex, indicated at 16. Vistanex is the trade name for a polymerised straight chain hydrocarbon, namely polyisobutylene, and is a substantially permanently tacky adhesive of relatively high viscosity which is substantially non-oxidizable at normal room temperatures. Such a laminated wrapping material, with a Pliofilm on the inner side, permits forming a rectangular shaped package, such as indicated at 10 in Fig. 8, by virtue of heat sealing the side and top edges of the package in face to face relation, namely, Pliofilm layer against Pliofilm layer. The package 10 can be folded from one sheet of stock, giving, as indicated in Fig. 6, a seamless bottom.

The precise form of edge or top foldings plays no part in our invention.

As indicated in Fig. 8 at 18, the envelope may loosely envelop the cheese 20, and as will be recognized by those skilled in the art, may be applied by modern packaging machines. No special "ironing" machinery is necessary to iron the surface of the wrapping against the cheese in contact therewith.

While possibly desirable, we have found it is not necessary to package the cheese in neutral atmosphere, $CO_2$, or to vacuum pack the cheese.

Our invention has particular reference to partially cured natural "American" cheese, but may be used for other cheeses either partially or fully cured. In dealing with partially cured cheese of the "American" type, we have found that gases are evolved, and if we provide an envelope which will vent excessive gas pressures, the wrapping materials as described above will permit packaging partially cured cheese in a unit as desired, without rind, and that such cheeses will be preserved for definite periods without signs of rind or mould, dependent upon the cheese and the temperatures which are maintained.

As indicated in the drawing, the small portions of cheese wrapped by our method may be rectangular in cross-section and may be formed in any convenient unit weights, such as half a pound to one or two pounds.

With the particular package described hereinabove, formed of sheets of aluminum foil and Pliofilm of the thickness given, we find that a package formed as indicated in Fig. 8 will preserve the cheese and prevent the admission of outside atmosphere into the package where the side seam is heat fused for about one-third to one-half inch and the package roughly measures three and a half inches in length, one inch thick, and two and a half inches in width. With such a package, any gas pressures built up within the package tend to penetrate through the Pliofilm side edges and which are in face to face contact.

In other words, by our invention the package vents excessive gas pressures, but prevents the entrance of any outside gases at atmospheric pressures carrying spores or mould which might tend to cause the cheese to get stale or cause mould.

As indicated in Fig. 3, a suitable thickness of Pliofilm 14' may be directly coated upon the metal foil 12', if desired, and continuous packaging methods be employed in cutting and forming the inner envelopes whether using laminated stock, as herein described, or coated stock.

A particularly desirable feature of our invention described above, is the provision of a tacky adhesive, Vistanex, between the Pliofilm and the metal foil, as the Vistanex aids in making the package vaporproof, and the package is substantially vaporproof with the exception of the fused face to face Pliofilm portions.

Functionally, our invention resides in a venting flexible cheese package irrespective of the particular film or adhesive employed, and our invention particularly is commercial because of the face to face edge seal of the heat fusible film.

It will be understood that while the illustrated forms of the invention which we have described, illustrate certain preferred embodiments of our invention, we do not wish to be limited to the precise details which are shown, since it is obvious that the same may be considerably varied without departing from the spirit of the invention as herein described and claimed in the appended claims, and that the essence of our invention resides in providing a flexible cheese package for fully or partially cured "American" or other cheeses, or other gas producing products, which will vent any gases evolved by the cheese where excessive pressures are built up. It is also obvious that such package as we have described may be modified to a degree and used as an inner liner with an outside paper carton or the like.

We claim:

1. A flexible package for partially cured "American" cheese, packaged in small units without rind, which includes, in combination with a unit of partially cured cheese, an outside layer of metal foil and an inner layer of rubber hydrochloride material, so formed that marginal portions of the inner layer are in face to face contact and heat fused the sealed package receiving and holding $CO_2$ evolved from the cheese in the curing thereof to the point that the $CO_2$ reaches a pressure above atmospheric and distends the walls of the package, an edge area of the heat fused marginal portions of the contacting inner layer of rubber hydrochloride base material being atmospherically exposed thus providing a substantially hermetically sealed package which will vent excessive internal gas pressures, said inner layer being spaced from said cheese throughout a substantial portion of its area, whereby gas retaining spaces are formed between said cheese and said inner layer.

2. A flexible package for loosely wrapping a gas emitting food product, said package formed from a sheet comprising laminated layers of flexible metal foil, and flexible, heat fusible, sheeting, a layer of adhesive uniting said layers, said sheet folded back on itself to provide a seamless bottom, the side and top edges of said sheet being heat sealed by fusing face contacting margins of the heat fusible sheeting, and said edges atmospherically exposed, the package thus formed being adapted to hold a volume of gas produced by organic reaction in the gas emitting food product and whereby gases from a food product enclosed within said package will pass through said heat sealed edges when said gas pressure becomes substantially greater than the atmospheric pressure.

3. A flexible package for loosely wrapping a gas emitting food product, said package formed from a sheet comprising an outer layer of flexible metal foil, an inner layer of flexible, heat fusible, sheeting normally impervious to gases at atmospheric pressure but becoming increasingly pervious as pressure increases above atmospheric pressure, a layer of adhesive uniting said inner and outer layers, said sheet folded back on itself to provide a seamless bottom, the side and top edges of said sheet being sealed, inner layer to inner layer only, and said edges exposed to the outer atmosphere whereby gases from a food product contained within said package will accumulate in the package until the pressure thereof becomes substantially greater than atmospheric pressure and whereby said pressure will be relieved by the passage of the gases through said heat sealed edges.

4. A method of packaging a gaseous emitting partially cured cheese comprising enclosing said cheese in a flexible sheet comprised of an outer layer of metal foil and an adhesively secured inner layer of a flexible, heat fusible, sheeting, said inner layer being spaced from said cheese throughout a substantial portion of its area whereby gas retaining spaces are formed between said cheese and said inner layer, heat sealing said sheet along its edges inner layer to inner layer, whereby said edges remain exposed to the outer atmosphere and act to retain within the package a volume of $CO_2$ emanated from the partially cured cheese during its aging, said edges acting to release gas above atmospheric pressure from within said package.

5. A method of retaining gas around a gas emitting product and utilizing the gas for the purpose of maintaining the quality of the product, said method comprising wrapping said product with a flexible non-porous material substantially impervious to the passage of air and $CO_2$, said material and wrapper being adapted to hold a volume of $CO_2$ under pressure above atmospheric and said wrapper having means integral therewith for releasing pressure from said package when said pressure becomes excessive, said means comprising atmospherically exposed sealed edges of said material.

CLIFFORD B. PAPE.
JAMES P. LANGWILL.